Patented Apr. 15, 1947

2,419,166

UNITED STATES PATENT OFFICE 2,419,166

VINYLIDENE CHLORIDE-VINYL CHLORIDE COPOLYMER CURED WITH AN ARYL GUANIDINE

Thomas H. Rogers, Jr., and Robert D. Vickers, Akron, Ohio, assignors to Wingfoot Corporation, Akron, Ohio, a corporation of Delaware No Drawing. Application June 11, 1943, Serial No. 490,488

8 Claims. (Cl. 260—42)

This invention relates to improved plastic compositions having desirable thermosetting characteristics and to a method of marking the same. More particularly, it relates to the effect of guanidines with or without phenol-formaldehyde type resins, in the curing of polymerized masses.

A thermoplastic resin which can be made thermosetting is obviously desirable in the manufacture of molded parts where the resin must be easily manipulable before setting and comparatively immobile after it has been given its final shape. This is also true in the manufacture of extruded articles where the resin must be soft enough in the uncured state to be extruded and then, when subjected to pressure and heat, to become set. Also, a resin having these characteristics would find use in the building of structures from fabric coated with the resin, such as pontoons, inflatable boats, and gas containers. In the manufacture of such fabric articles, a seam which is sealed with the resin must be capable of withstanding a test load at an elevated temperature without flow. A method of treating resins which would effect the desired thermosetting would be, therefore, of great value. The present invention has as an object the provision of plastic compositions affording the above-indicated advantages. Another object is the provision of a method of treating resins to secure this result.

According to the terms of this invention, certain polymerized compositions which have desirable properties as plastics for the production of molded parts and other purposes are so treated as to increase their strength and resistance to flow, and also to reduce their solubility in solvents by curing the compositions in a prescribed manner. The compositions which have been found to be amenable to the treatment are copolymers made by polymerizing monomeric material including vinylidene chloride and vinyl chloride. The treatment comprises curing or vulcanizing the copolymer by heating the same in the presence of a guanidine which results in a composition of improved modulus as compared with the uncured stock, and also of greatly lessened or wholly eliminated solubility in various solvents, such as methyl ethyl ketone. The invention also comprises the curing of the copolymer in the presence of a heat-hardenable or thermosetting phenol-formaldehyde type resin in addition to the guanidine, the presence of one of the Bakelite resins, as these are commercially known, resulting in a product of simiilar physical characteristics but with a flatter curing curve.

The plastics which are thus improved in physical characteristics by treatment, according to the hereindescribed method, are those containing from 10% to approximately 25% of vinylidene chloride, the balance of the monomeric mixture, 90% to 75%, from which the copolymer is made, being vinyl chloride. Particularly good results are obtained by the treatment of copolymers ranging from about 10% to 20% of vinylidene chloride and correspondingly, from about 90% to 80% of vinyl chloride. Among others, many commercial resins may be treated with advantage, including copolymers of vinyl chloride-vinylidene chloride 85:15, and vinyl chloride-vinylidene chloride 90:10. It has been determined that an increase in tensile strength of at least 50% over that of the uncured copolymer should be attained in order to give results of practical importance; increases of less than this amount do not improve the characteristics of the plastics sufficiently to make them valuable for the uses herein described.

The method is accomplished by heating the resin to a curing temperature, such as a temperature between about 240° and 360° F., although the temperature may be higher or lower than this, in the presence of a guanidine, preferably an aromatic or aryl-substituted guanidine, particularly the di and tri-substituted aryl guanidines. The time of cure is that required to achieve an increase in tensile strength of at least 50%, from fifteen to thirty minutes usually being required, but sixty minutes not being excessive where a phenol-formaldehyde resin is present. Among the guanidines which may be used are diphenyl guanidine, diortho tolyl guanidine, tri-phenyl guanidine, tritolyl guanidine, phenyl tolyl guanidine, dixylyl guanidine, di alpha naphthyl guanidine, dicyclohexyl guanidine, di ortho-methyl cyclohexyl guanidine and guanidine salts, such as guanidine carbonate and guanidine acetate. The guanidine is used in the proportion of about 1% to 10% on the weight of the plastic or copolymer, but results are usually obtained when 4% to 6% is used. Where a phenol-formaldehyde type resin is also employed, it will be present to the extent of about 2% to 10%, preferably 5% to 10%. Among the "phenolics" which may be used are cresol-formaldehyde resin, phenol-formaldehyde resin, xylenol-formaldehyde resin, resorcinol-formaldehyde resin, and phenol-furfural resin.

In addition to the guanidine, or the guanidine and phenol-formaldehyde resin, there may be present in the stock to be cured an acid inhibitor or acceptor, such as magnesium oxide, sodium carbonate and magnesium carbonate, which, while not essential for cure, aids in preventing the deterioration of the composition at the elevated temperatures of cure and thus gives optimum physical properties. Magnesium oxide is particularly valuable in this respect. There will also be present, in most instances, a plasticizer such as dibutyl sebacate, methoxy ethyl oleate, dioctyl phthalate, tributyl phosphate, and the like, although it will be understood that the plasticizer is not strictly necessary in carrying out the method of the invention. However, the plasticizer may affect the rate of cure and, to this extent, must be considered in connection with the performance of the process. Also the plasticizer is required in varying amounts to give a stock of selected characteristics, the desired improvement being obtained as a result of the influence of the cure in the presence of the plasticizer. Carbon black and other pigments may also be present as desired.

To illustrate the invention, the following example is given, the same being purely illustrative and not intended in a limiting sense.

*Example 1*

A suitable stock was prepared by mixing granular or powdered vinyl chloride-vinylidene chloride copolymer (85:15) with about 25% of the total dibutyl sebacate to be added as a plasticizer. The mix was then placed on a hot mill. After ten minutes mixing, the remainder of the dibutyl sebacate was added, followed by magnesium oxide and carbon black in the proportions indicated below. Before the guanidine is added to the mass, the mill is cooled by running cold water through it. Four parts of either diphenyl guanidine, diortho tolyl guanidine, or triphenyl guanidine are added with thorough mixing, and the stock is then sheeted out and cut for cure. The stock was cured by placing between aluminum foil to prevent sticking, and cured in a press at a temperature of 320° F. under a pressure of 1,500 pounds p. s. i. A basic stock such as this may be additionally compounded, if desired, so as to be readily removed directly from a hot mold, using no aluminum foil.

The following results were obtained upon test, the tensile strength and elongation begin determined on an autographic Scott machine, and solubility in methyl ethyl ketone (MEK) being determined by rubbing the cured stock with a cloth saturated with the solvent, the carbon black in the stock serving as an indicator.

|  | (1) | (2) | (3) | (4) |
|---|---|---|---|---|
| *Formulae* | | | | |
| Vinyl-vinylidene chloride polymer | 100.00 | 100.00 | 100.00 | 100.00 |
| Dibutyl sebacate | 35.00 | 35.00 | 35.00 | 35.00 |
| MgO | 5.00 | | 2.00 | 5.00 |
| Carbon black | 1.00 | 1.00 | 1.00 | 1.00 |
| Diphenyl guanidine | | 4.00 | | |
| Diortho tolyl guanidine | | | 4.00 | |
| Triphenyl guanidine | | | | 4.00 |
| *Results* | | | | |
| Tensile in kg./cm.² at room temperature: Cure 320° F. for— | | | | |
| 10 min | 42 | 126 | 123 | 70 |
| 20 min | 52 | 140 | 144 | 100 |
| 40 min | 58 | 148 | 139 | 144 |
| 60 min | 56 | 140 | 127 | 118 |
| Elongation at room temperature in per cent: Cure 320° F. for— | | | | |
| 10 min | 200 | 300 | 305 | 275 |
| 20 min | 250 | 275 | 300 | 325 |
| 40 min | 250 | 200 | 155 | 300 |
| 60 min | 250 | 150 | 100 | 175 |
| Solubility in methyl ethyl ketone:[1] Cure 320° F. for— | | | | |
| 10 min | S | NS | SS | SS |
| 20 min | S | NS | NS | NS |
| 40 min | S | NS | NS | NS |
| 60 min | S | NS | NS | NS |

[1] S—soluble, SS—slightly soluble, NS—not soluble.

It will be noted that the tensile strength was more than doubled by the use of one of the above-described guanidines over that obtained when no guanidine was present. As mentioned, best results are obtained when an acid inhibitor or acceptor, particularly magnesium oxide, is present, but magnesium oxide in the absence of a guanidine does not give the desired improvement in tensile strength. The influence of the guanidine on solubility is clearly shown, samples containing the guanidine, but not those without it, becoming insoluble in methyl ethyl ketone (MEK) when the cure is sufficiently advanced. It will be obvious that a composition of increased tensile strength and resistance to flow and of comparative insolubility with respect to solvents, of which methyl ethyl ketone is merely exemplary, is of greater value in structures and articles which are subject to strain and exposed to solvents in use. Results obtained with the use of both a guanidine and a phenol-formaldehyde resin are similar, but the stock displays the improved physical characteristics over a wider range of curing periods with little or no diminution of strength.

*Example 2*

In another example, the vinyl-vinylidene chloride copolymer was compounded with diphenyl guanidine and other ingredients with the following formulae:

| Formulae | (1) | (2) | (3) |
|---|---|---|---|
| Vinyl-vinylidene chloride 85:15 | 100.00 | 100.00 | 100.00 |
| Methoxy ethyl oleate | 65.00 | 67.50 | 67.50 |
| MgO | 5.00 | 5.00 | 5.00 |
| Carbon Black | 1.00 | 1.00 | 1.00 |
| Diphenyl guanidine | 4.00 | 4.00 | 4.00 |
| Soybean lecithin | 2.00 | 2.00 | 2.00 |
| Whiting | 70.00 | 70.00 | |

In a Banbury mixer was first placed the copolymer in the form of a powder to which had been added the magnesium oxide and carbon black. About 20% of the total copolymer (total batch 2,000 grams) is first added, followed by 20% of the plasticizer, methoxy ethyl oleate. After about two minutes mixing, another 20% of the copolymer is placed in the mixer, followed by another charge of plasticizer, until the copolymer and plasticizer are completely mixed. The soybean lecithin and the whiting are mixed into the soft, flexible copolymer-plasticizing mass. Mixing is continued, after turning cold water on the Banbury mixer, and, by the time the whiting is dispersed, the mixer has been cooled sufficiently to permit the ejection of the rubbery mass. This is then sheeted out on a cold mill, two passes being all that are necessary, and the material is ready for molding.

The products treated by the hereindescribed method have their properties improved in a number of respects, all tending toward materials with more useful characteristics. As mentioned, the tensile strength is increased, this being true both at room temperature and at higher temperatures, such as 135° F., a temperature often used as a standard in testing the strength of adhesive materials. At the same time, the tendency of the resin to cold flow is sharply reduced, while no appreciable increase in hardness is apparent. The shear strength is also greatly improved.

The products may be described as resins comprising a copolymer of vinylidene chloride and vinyl chloride, plus the residue of a substituted guanidine, specifically an aryl-substituted guanidine, and of a phenol-formaldehyde resin where used. Upon heating such a mixture, either with or without a plasticizer, a profound change in physical properties takes place and the resin becomes thermosetting. Accompanying this is a change in the chemical structure of the resin, as evidenced by nitrogen extraction, and, more particularly, chlorine extraction. Thus, more nitrogen can be extracted from an uncured sample than can be extracted from a cured sample. Similarly and perhaps more significant, less chlorine can be extracted from an uncured sample than can be extracted from a cured sample of the same original composition and of the same weight. This indicates a labilization or loss of chlorine from the copolymer; that is to say, the chlorine is disengaged and is presumably taken up by the magnesium oxide, or other inorganic substance which may be present, to form magnesium chloride or other easily extractable material. As a consequence of the removal or transference of some of the chlorine atoms in the vinyl chloride or vinylidene chloride, bonds are made available for further polymerization of the organic constituents of the resin. Hence, the resin sets under the influence of heat and becomes hard and strong. If a phenol-formaldehyde resin be also present, further combination may take place between the copolymer and resin or between these and the guanidine.

Therefore, while the chemical mechanism of the curing operation is not definitely established, it appears that the vulcanizates obtained by the use of one of the described class of guanidines as a curing agent generally contains nitrogen in a form which is much less readily extractable than is the nitrogen present in the uncured composition, and this despite the fact that the guanidine is a substance made readily extractable from the uncured compositions. Furthermore, the presence of ionizable chlorine in extractions of the cured samples would indicate removal of chlorine from the polymer chain. Naturally, the phenolic resin will be represented in the cured material as a residue, and probably in combination with the other ingredients.

As stated above, numerous substituted guanidines may be used for the purposes of the invention but, of these, the diaryl and triaryl guanidines are preferred, particularly the di- and triphenyl and di- and tritolyl guanidines. Cresolformaldehyde resin is the preferred "phenolic." Usually, the resins employed have a composition corresponding to combining or equimolecular proportions of the phenolic compound and the aldehyde, and are heat-hardenable or thermosetting.

While there have been described above preferred embodiments of the invention, it will be apparent to those skilled in the art that various modifications and changes may be made therein without departing from the spirit of the invention or from the scope of the appended claims.

We claim:
1. A method of curing a copolymer of about 10% to 20% of vinylidene chloride and the balance vinyl chloride, which comprises incorporating therein about 10% to 150% on the weight of the copolymer of a plasticizer and about 1% to 10% on the weight of the copolymer of a gaunidine having at least two aryl substituents, and then heating the mixture to a temperature between about 240° and 360° F. until a product is obtained having a tensile strength at least 50% greater than that of the uncured copolymer.

2. A method of curing a copolymer of about 10% to 20% of vinylidene chloride and the balance vinyl chloride which comprises heating the copolymer in the presence of about 1% to 10% of diorthotolyl guanidine and about 2% to 10% of a heat-hardenable cresol-formaldehyde resin at a temperature between about 240° and 360° F. until there is obtained a material having a tensile strength at least 50% greater than that of the uncured stock.

3. A method of preparing a thermoset copolymer of a monomeric mixture of from 10 to 25 percent vinylidene chloride and the balance of vinyl chloride which comprises incorporating from 1 to 10 percent (based on the weight of the copolymer) of a guanidine having at least two aryl substituents and heating the mixture to a temperature from 240° F. to 360° F. until a product is obtained having a tensile strength at least 50 percent greater than that of the uncured copolymer.

4. A method of preparing a thermoset copolymer of a monomeric mixture of from 10 to 25 percent vinylidene chloride and the balance of vinyl chloride which comprises incorporating from 1 to 10 percent (based on the weight of the copolymer) of diphenyl guanidine and heating the mixture to a temperature from 240° F. to 360° F. until a product is obtained having a tensile strength at least 50 percent greater than that of the uncured copolymer.

5. A method of preparing a thermoset copolymer of a monomeric mixture of from 10 to 25 percent vinylidene chloride and the balance of vinyl chloride which comprises incorporating from 1 to 10 percent (based on the weight of the copolymer) of di-ortho-tolyl guanidine and heating the mixture to a temperature from 240° F. to 360° F. until a product is obtained having a tensile strength at least 50 percent greater than that of the uncured copolymer.

6. A method of preparing a thermoset copolymer of a monomeric mixture of from 10 to 25 percent of vinylidene chloride and the balance vinyl chloride which comprises heating the copolymer at a temperature of 240° F. to 360° F. in the presence of from 1 to 10 percent of a guanidine having at least two aryl substitutents and from 2 to 10 percent of a heat-hardenable resin made by the condensation of a phenol and an aldehyde, said heat being continued until there is obtained a material having a tensile strength at least 50 percent greater than that of the uncured stock.

7. A method of preparing a thermoset copolymer of a monomeric mixture of from 10 to 25 percent of vinylidene chloride and the balance vinyl chloride which comprises heating the copolymer at a temperature of 240° F. to 360° F. in the presence of from 1 to 10 percent of diphenyl guanidine and from 2 to 10 percent of heat-hardenable cresol-formaldehyde resin, said heat being continued until there is obtained a material having a tensile strength at least 50 percent greater than that of the uncured stock.

8. A method of preparing a thermoset copolymer of a monomeric mixture of from 10 to 25 percent vinylidene chloride and the balance of vinyl chloride which comprises incorporating from 1 to 10 percent (based on the weight of the copolymer) of a guanidine having at least two aryl substituents and heating the mixture to a temperature from 240° F. to 360° F. for a period of from 15 to 30 minutes.

THOMAS H. ROGERS, JR.
ROBERT D. VICKERS.

REFERENCES CITED

The following references are of record in the file of this patent:

UNITED STATES PATENTS

| Number | Name | Date |
|---|---|---|
| 2,117,591 | Alexander | May 17, 1938 |
| 2,245,742 | Alexander et al. | June 17, 1941 |
| 2,148,831 | Raynolds | Feb. 28, 1939 |
| 2,270,662 | Raney | Jan. 20, 1943 |
| 2,304,637 | Hardy | Dec. 8, 1942 |
| 2,190,776 | Ellingboe et al. | Feb. 20, 1940 |
| 2,336,792 | Langkammerer | Dec. 14, 1943 |